United States Patent
Doerfler (12)

(10) Patent No.: US 6,270,605 B1
(45) Date of Patent: Aug. 7, 2001

(54) METHOD OF MANUFACTURING LIGHTWEIGHT GLAZING BY MULTILAYER GLASS/PLASTIC SHEETS

(75) Inventor: Thomas Doerfler, Erftstadt (DE)

(73) Assignee: Ford Global Technologies, Inc, Dearborn, MI (US)

( * ) Notice: Subject to any disclaimer, the term of this patent is extended or adjusted under 35 U.S.C. 154(b) by 0 days.

(21) Appl. No.: 09/489,162

(22) Filed: Jan. 21, 2000

(30) Foreign Application Priority Data

Jan. 27, 1999 (GB) .................................................. 99101442

(51) Int. Cl.$^7$ ...................................................... B32B 17/10
(52) U.S. Cl. ......................... 156/102; 156/106; 156/221; 156/222; 65/54
(58) Field of Search .............................. 156/99, 102, 106, 156/109, 212, 196, 221, 222, 306.6; 65/54

(56) References Cited

U.S. PATENT DOCUMENTS

| | | | |
|---|---|---|---|
| 4,579,448 | | 4/1986 | Nowak et al. . |
| 4,600,640 | | 7/1986 | Olson . |
| 4,744,844 | * | 5/1988 | Hurst .................................... 156/101 |
| 4,969,966 | * | 11/1990 | Norman ............................... 156/102 |
| 5,443,669 | * | 8/1995 | Tunker ................................. 156/102 |
| 5,589,272 | | 12/1996 | Braun et al. . |

FOREIGN PATENT DOCUMENTS

| | | |
|---|---|---|
| 295 10 400 U1 | 10/1995 | (DE) . |
| 0 245 175 B1 | 11/1987 | (EP) . |
| 0 669 205 A1 | 8/1995 | (EP) . |
| 0 816 064 A1 | 1/1998 | (EP) . |
| 2 750 075 A1 | 12/1997 | (FR) . |
| 2 759 628 A1 | 8/1998 | (FR) . |
| 1184042 | 3/1970 | (GB) . |

* cited by examiner

Primary Examiner—Michael W. Ball
Assistant Examiner—John T. Haran
(74) Attorney, Agent, or Firm—Lorraine S. Melotik; William J. Coughlin

(57) ABSTRACT

A method of manufacturing a curved glass/plastic laminate sheet for lightweight automotive glazing is disclosed. A flat laminate is build up with two thin glass layers, one inner and one outer, and a thick middle layer of thermoplastic. The flat laminate is heated to a plasticity temperature of the thermoplastic and it may be fit into a mould so that bending occurs mainly due to plastic transverse shear deformation of the plastic layer. Glass bending is limited to elastic bending of the single glass layers. Residual bending stresses in the glass layers are avoided by preferably incorporating pre-bending stresses in the flat glass layers. Strengthening of the final glass layers is achieved by incorporating compression stresses on the bent pane through heat treatment and having different thermal expansion coefficients of glass and plastic.

6 Claims, 1 Drawing Sheet

METHOD OF MANUFACTURING LIGHTWEIGHT GLAZING BY MULTILAYER GLASS/PLASTIC SHEETS

FIELD OF THE INVENTION

The present invention relates to a method of manufacturing a multi-layer glazing of glass/plastic sheets useful as lightweight glazing for automotive applications.

BACKGROUND OF THE INVENTION

It is desirable to reduce the weight of glazing used in automotive vehicles. At present four main types of automotive glazing are of interest for weight reduction: (1) overall reduced thickness of the glass, (2) bi-layer laminated glass/plastic sheet, (3) plastic sheets with hard and scratch resistant coating, (4) multi-layer glass/plastic glazing. Weight reduction by reduced overall glass thickness is limited, however, because of manufacturing, noise and security requirements: The glass pane must be manageable during the whole manufacturing process. The manufacturing process for laminated windshields disclosed in EP 0 245 175 B1 will allow only slight reduction in thickness. Furthermore thickness reduction will increase the interior noise level because thinner glass transforms windnoise as well as body vibrations more directly to the interior. That means also sidelites, mostly affected by windnoise, are limited with regard to thickness reduction. In addition, all glazing must meet security requirements which requires a certain thickness of glazing all around the vehicle.

The main disadvantage of glazing made from bi-layer sheets of glass and plastic is the less than desirable scratch resistance of the plastic surface, which is not satisfying for automotive applications at the moment. Lightweight glazing could also be achieved by manufacturing the glazing from plastic sheets, covered with scratch resistant surfaces. Several disclosures deal with this approach, but at the moment none of these technologies has been introduced on high volume products.

A very efficient approach for lightweight glazing is a "Sandwich" glazing, i.e., a multi-layer sheet as disclosed in U.S. Pat. No. 5,589,272: Two thin glass layers, one inner and one outer, combined with a thick middle layer made of plastic. Its disadvantage at the moment is the manufacturing process. Handling of the thin glass layers is very difficult, which means that the size of sheets is limited, especially for curved panes.

Therefore, it is a primary object of the present invention to provide a method of manufacturing lightweight automotive glazing based on the Sandwich approach with multi-layer sheets with none of the above mentioned drawbacks. The above and other objects, features and advantages of the present invention will become more apparent from the following description when taken in conjunction with the accompanying drawings.

SUMMARY OF THE INVENTION

According to the present invention, there is provided a method of manufacturing a curved multi-layer glass/plastic laminate for lightweight automotive glazing. The invention method comprises first providing a flat multi-layer laminated sheet comprising inner and outer flat glass layers with a thermoplastic layer in between. The glass layers are joined to the thermoplastic layer by bonding or welding. Each of the glass layers is $1/5$ to $1/50$ of the total laminate thickness. The method further comprises heating the laminate to the plasticity temperature of the thermoplastic layer while subjecting the flat laminate to a bending process to provide a curved shape to the laminates. This bending of the laminate involves plastic transverse shear deforming of the plastic layer due to thermal deflection and elastic bending in the glass layers without plastic deformation of the glass layers.

Optionally, the method may further include having a pre-bending stress incorporated in each flat glass layer and subjecting the shaped laminate to a post heat to strengthen the curved glass layers by incorporating compression stresses in the glass layers.

PREFERRED EMBODIMENT OF THE INVENTION

Figure 1:
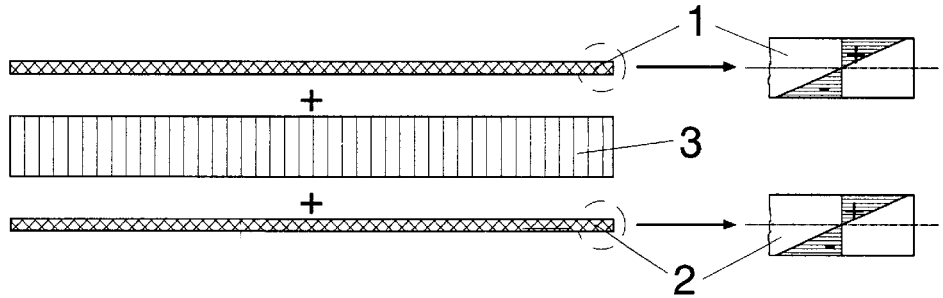
FIG. 1 is a cross-sectional view on the flat layers used to manufacture the flat laminate and the pre-bending stresses in the glass layers.

One embodiment of the present manufacturing invention can be understood by observing the figures. FIG. 1 shows the structural principle of an embodiment of the new laminate before the shaping manufacture with inner glass layer 1, outer glass layer 2 and the middle thermoplastic layer 3. All three layers are joined either by an additional film of adhesive between each layer or by welding both glass layers to the thermoplastic layer by melting the plastic of the thermoplastic layer. For handling and process reasons such a laminate is to be manufactured as a flat plate. Therefore all raw sheets, the glass and interlayer(s) are flat before joining to form the laminate. Desirably, however, to avoid residual bending stresses in the glass layers after bending to their final shape, pre-bending stresses are optimally incorporated in the glass layers as it is done for tempered glass. The principal stress distribution in such pre-stressed glass is also shown in FIG. 1.

Figure 2:
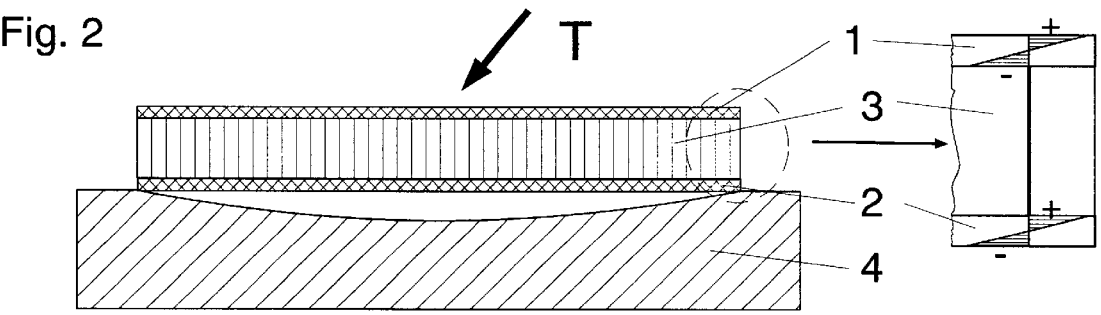
FIG. 2 is a cross-sectional view of the flat laminate in a mould and the stresses in each layer.
Figure 3:
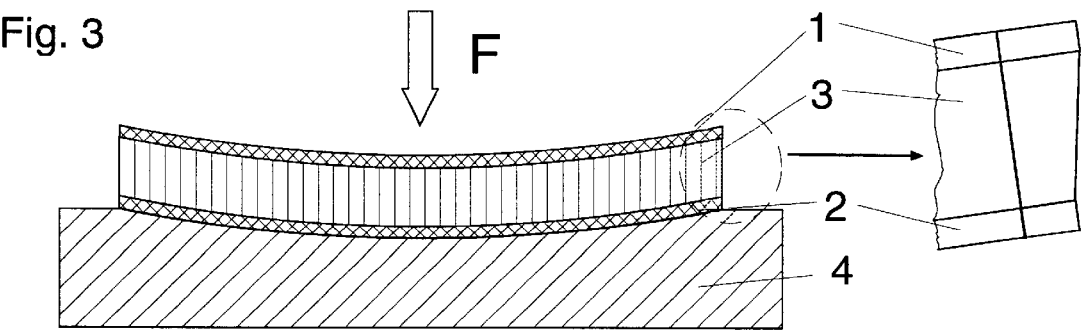
FIG. 3 is a cross-sectional view of the laminate bent to it's final shape in the mould and the resulting stresses.

For further forming into a curved shape, a laminated initial pane of desired design is cut out of a flat laminate. The next step is the bending of this initial pane such as in a mould 4 as shown in FIG. 2. This bending is accomplished by first heating the whole laminated pane to the plasticity temperature T of the thermoplastic layer of the laminate. The two glass layers of the laminate are not affected by thermal deformation because their glass temperature is much higher. Then a load F is applied to fit the heated pane to the mould 4, as shown in FIG. 3. The load can be gravity load, heated air streams or other useful methods.

Under such conditions bending of the pane results mainly from the shear deformation of the thermoplastic layer 3 due to it's thermal weakness. Both glass layers, 1 and 2, cannot act as counterparts like the flanges on an H-beam, because of the shear weakness of the middle layer 3. Their only contribution to bending stiffness is the bending stiffness of each single glass layer. Due to the low thickness of the glass layers proposed here, bending radii of less than 1 m could be achieved without exceeding the strength of the glass.

Stress distribution before and after bending are shown both in FIGS. 2 and 3: before bending the pre-bending stresses in both glass layers are as shown in FIG. 2. Stresses from the resulting counter bending moment to achieve static equilibrium of bending moments are neglected because of the much higher bending stiffness of the complete pane which is acting as a structural Sandwich. After bending the laminate in the mould, the pre-bending stresses in both glass layers disappear, see FIG. 3. Also no shear and bending stresses result in the plastic layer because of complete plastic thermal deformation.

In some cases, especially if there is a slight crown in the pane, shell stresses may appear somewhere in the glass layers. Then local heat can be applied on the glass layers for a very short time at these high stressed areas so that stress peaks can be reduced by plastic thermal deformation.

Figure 4:
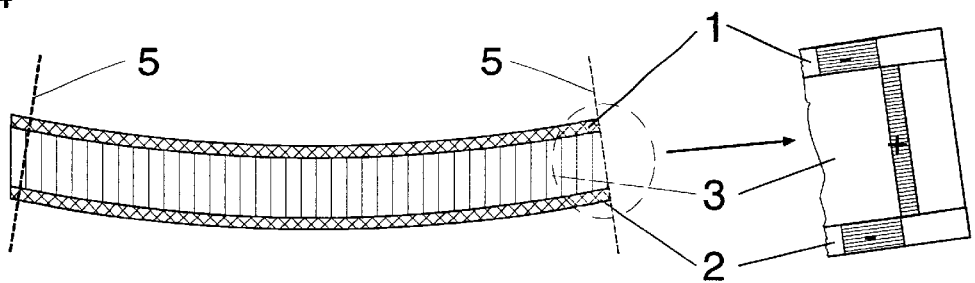
FIG. 4 is a cross-sectional view on the shaped laminate showing the final cutting lines of the pane's edges and incorporated compression stresses in the glass layers.

Optimally, the last step of the manufacturing process, as shown in FIG. 4, is cutting the edges of the shaped pane to it's final shape. As can be seen at the cutting lines 5, the cut off from the inner glass layer 1 is longer than the cut off from the outer glass layer 2, which is a result of the said shear bending.

To achieve a better strength of the glass surface a compression stress can be introduced in both glass layers during cooling the pane. When heated and cooled in a defined way, the plastic layer is drawing more than the glass layers which induces a favourable compression stress to the glass. Final stress distribution is also shown in FIG. 4.

I claim:

1. A method of manufacturing a curved shape multi-layer laminated glazing sheet useful for automotive applications, the method comprising:

providing a flat laminate of two layers of very thin glass containing between the glass layers a thermoplastic layer with specific weight less than that of the glass, each glass layer being approximately $\frac{1}{5}$ or less of total laminate thickness, with each glass layer being bonded to the adjacent thermoplastic layer by a film of adhesive or with the glass layers joined to the thermoplastic layer by melting of the thermoplastic layer; and heating the flat laminate to the plasticity temperature of the thermoplastic layer and bending the heated flat laminate into a curved shape wherein the bending of the laminate involves plastic transverse shear deforming of the plastic layer due to thermal deflection and elastic bending in the glass layers without plastic deformation of the glass layers.

2. The method according to claim 1, which further comprises incorporating pre-bending stresses in both glass layers in such a way that bending stresses disappears in the glass layers after bending the laminate to its curved shape.

3. The method according to claim 2, wherein the laminate subjected to heating and bending has been cut from a laminate into a preliminary shape.

4. The method according to claim 3, wherein said bending comprises bending the flat laminate pane in a mould by applied forces or gravity.

5. The method according to claim 1, wherein during bending the glass layers are heated locally to the glass temperature of the glass for a short time to achieve defined locally plastic deformation in the glass layers.

6. The method according to claim 1, wherein said shaped laminate is subjected to an additional heat treatment to achieve an overall compression stress in both glass layers by having different thermal expansions coefficients of glass and plastic layers.

* * * * *